United States Patent
Ben Chehida et al.

(10) Patent No.: US 10,846,086 B2
(45) Date of Patent: Nov. 24, 2020

(54) METHOD FOR MANAGING COMPUTATION TASKS ON A FUNCTIONALLY ASYMMETRIC MULTI-CORE PROCESSOR

(71) Applicant: COMMISSARIAT A L'ENERGIE ATOMIQUE ET AUX ENERGIES ALTERNATIVES, Paris (FR)

(72) Inventors: Karim Ben Chehida, Suresnes (FR); Paul-Antoine Arras, Massy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 104 days.

(21) Appl. No.: 16/333,974

(22) PCT Filed: Sep. 6, 2017

(86) PCT No.: PCT/EP2017/072376
§ 371 (c)(1),
(2) Date: Mar. 15, 2019

(87) PCT Pub. No.: WO2018/059897
PCT Pub. Date: Apr. 5, 2018

(65) Prior Publication Data
US 2019/0250919 A1 Aug. 15, 2019

(30) Foreign Application Priority Data

Sep. 29, 2016 (FR) ..................................... 16 59367

(51) Int. Cl.
*G06F 9/455* (2018.01)
*G06F 9/30* (2018.01)
(Continued)

(52) U.S. Cl.
CPC ........ *G06F 9/30156* (2013.01); *G06F 1/3228* (2013.01); *G06F 9/3885* (2013.01);
(Continued)

(58) Field of Classification Search
CPC ..................................................... G06F 1/3228
See application file for complete search history.

(56) References Cited

U.S. PATENT DOCUMENTS

| | | | |
|---|---|---|---|
| 2007/0234094 A1* | 10/2007 | Samra | G06F 9/3891 713/324 |
| 2009/0222654 A1* | 9/2009 | Hum | G06F 1/3206 713/100 |

(Continued)

OTHER PUBLICATIONS

Shen, et al., "Novel Task Migration Framework on Configurable Heterogeneous MPSoC Platforms", Proceedings of the 2009 Asia and South Pacific Design Automation Conference, pp. 733-738, 2009.

(Continued)

*Primary Examiner* — Hang Pan
(74) *Attorney, Agent, or Firm* — BakerHostetler (57) ABSTRACT

A method for managing a computation task on a functionally asymmetric multi-core processor includes a plurality of cores at least one of which comprises at least one hardware extension for executing specialized instructions, comprising the following steps: a) starting the execution of the computation task on a core of the processor; b) monitoring a parameter indicative of a quality of service of the computation task, and at least a number of specialized instructions loaded by the core; c) identifying instants splitting an application period of the computation task into a predetermined number of portions; d) computing costs or gains in quality of service and in energy consumption corresponding to different management options of the computation task; and e) making a management choice according to the costs or gains thus computed. Computer program product, processor and computer system for implementing such a method are also provided.

15 Claims, 4 Drawing Sheets

(51) Int. Cl.
*G06F 9/48* (2006.01)
*G06F 1/3228* (2019.01)
*G06F 9/38* (2018.01)
*G06F 9/50* (2006.01)

(52) U.S. Cl.
CPC .......... *G06F 9/4881* (2013.01); *G06F 9/5038* (2013.01); *G06F 9/5044* (2013.01); *G06F 2209/509* (2013.01); *Y02D 10/00* (2018.01)

(56) References Cited

U.S. PATENT DOCUMENTS

| | | | |
|---|---|---|---|
| 2010/0037038 A1* | 2/2010 | Bieswanger | G06F 9/5083 712/220 |
| 2012/0079235 A1* | 3/2012 | Iyer | G06F 9/4881 712/30 |
| 2014/0196050 A1* | 7/2014 | Yu | G06F 9/5088 718/104 |
| 2014/0298060 A1* | 10/2014 | Hooker | G06F 9/5094 713/323 |

OTHER PUBLICATIONS

Aminot, "Placement de taches dynamique et flexible sur processeur multicoeur asym'etrique en fonctionnalit'es", Universit'e Grenoble Alpes, Oct. 1, 2015.

Georgakoudis, et al., "Fast Dynamic Binary Rewriting for Flexible Thread Migration on Shared-ISA Heterogeneous MPSoCs", 2014 International Conference on Embedded Computer Systems: Architectures, Modeling, and Simulation (SAMOS XIV), pp. 156-163, Jul. 14, 2014.

Li, et al., "Operating system support for overlapping-ISA heterogeneous multi-core architectures", HPCA—16 2010 The Sixteenth International Symposium on High-Performance Computer Architecture, Jan. 2010.

* cited by examiner

METHOD FOR MANAGING COMPUTATION TASKS ON A FUNCTIONALLY ASYMMETRIC MULTI-CORE PROCESSOR

CROSS-REFERENCE TO RELATED APPLICATIONS

This application is a National Stage of International patent application PCT/EP2017/072376, filed on Sep. 6, 2017, which claims priority to foreign French patent application No. FR 1659367, filed on Sep. 29, 2016, the disclosures of which are incorporated by reference in their entirety.

FIELD OF THE INVENTION

The invention relates to a computer-implemented method for managing computation tasks on a functionally asymmetric multi-core processor. It also relates to a computer program product, a multi-core processor and a computer system for implementing such a method.

BACKGROUND

A multi-core processor may comprise one or more hardware extensions, intended to accelerate portions of specific software codes. For example, these hardware extensions may comprise circuits for floating point computation or vector computation.

A multi-core processor is said to be "functionally asymmetric" when all the cores do not possess the same hardware extensions, and therefore some extensions are lacking in some processor cores. Thus, a functionally asymmetrical processor is characterized by an unequal distribution (or association) of the extensions to the processor cores. There is an instruction set common to all the cores and specific instruction sets associated with respective hardware extensions, present in some cores. By combining all the instruction sets of the processor cores, all the instructions required by the execution of a computation task of an application are represented.

Managing a functionally asymmetric multi-core processor poses several technical problems, in particular that of effectively managing the placement of the computation tasks on the different processor cores.

Software applications use these hardware extensions dynamically, i.e. varying over time. For the same application, some computation phases will use a given extension at almost full load (e.g. computations on floating-point data) while other computation phases will use little or even nothing at all (e.g. computations on integer data). Using an extension is not always efficient in terms of performance or energy ("quality" of use).

The published work concerning the placement of computation tasks (scheduling) on functionally asymmetric multi-core processors does not describe fully satisfactory solutions.

The article by H. Shen and F. Pétrot, "Novel Task Migration Framework on Configurable Heterogeneous MPSoC Platforms", Proceedings of the 2009 Asia and South Pacific Design Automation Conference, Piscataway, N.J., USA, 2009, pp. 733-738, describes an "affinity" offline scheduling technique, which consists in freezing the allocation of a task to a processor (or to a type of processor) before execution following an offline analysis of the application (performed manually, by code analysis tools or by the compiler) and the online scheduler follows these directives exactly. The main drawback of this approach is that no other optimization is allowed online when the applications are dynamic and their resource use ratio varies with time and the data.

The article by G. Georgakoudis, D. S. Nikolopoulos, H. Vandierendonck and S. Lalis, "Fast Dynamic Binary Rewriting for flexible thread migration on shared-ISA heterogeneous MPSoCs", 2014 International Conference on Embedded Computer Systems: Architectures, Modeling, and Simulation (SAMOS XIV), 2014, pp. 156-163, describes a technique—called dynamic binary rewriting—which performs a fault-and-rewrite (i.e. when a specialized instruction is loaded by a core that does not support it) by emulating unsupported instructions. This is a flexible technique which may be effective, combined with an intelligent dynamic scheduler. However, the costs of rewriting and emulation may prove very significant.

The article by T. Li, P. Brett, R. Knauerhase, D. Koufaty, D. Reddy and S. Hahn, "Operating system support for overlapping-ISA heterogeneous multi-core architectures", 2010 IEEE 16th International Symposium on High Performance Computer Architecture (HPCA), 2010, pp. 1-12 describes a "fault-and-migrate" technique. It consists in migrating the execution of a task (at the granularity of a quantum of instructions), as soon as an unsupported specialized instruction is encountered by the current thread, to a resource having the corresponding hardware extension. Its main weakness is that it may cause unwanted migrations and a load imbalance between basic cores and cores with extension.

The thesis by A. Aminot "Méthode dynamique pour améliorer le placement de tâches sur processeurs asymétriques en fonctionnalités" (Dynamic method for improving the placement of tasks on functionally asymmetric processors), University of Grenoble, France, 2015, describes a method for dynamically allocating computation tasks wherein the choice of the core on which a task is executed is performed from an estimate on compilation of the cost of emulating said task. This estimate is obtained from measuring the number of uses of different specialized instructions in previous versions of the same task. Although interesting in principle, this technique is not optimized, and also needs a binary version of the task to be embedded per extension present in the architecture; in addition, it does not ensure compliance with quality of service (QoS) constraints.

SUMMARY OF THE INVENTION

The invention is aimed at overcoming, all or at least part, of the aforementioned drawbacks of the prior art. More particularly it is aimed at allowing both an optimal use of the computation resources (notably in terms of energy) and compliance with QoS constraints. To do this, it perfects the approach proposed in the aforementioned thesis by A. Aminot.

In general, any parameter representative of system performance, considered from the user's point of view, may be used as a QoS constraint according to different embodiments of the invention. By way of a non-restrictive example, the QoS of a computation task may be defined as the speed of execution (i.e. the inverse of the execution time) of said task.

To achieve this object, the invention provides several improvements to the prior art, which may be implemented separately or in combination. In particular:

In accordance with the invention, the management choices are made at key instants in the execution of each application, identified dynamically instead of being preset, ensuring QoS and minimizing energy consumption.

In some embodiments of the invention, specific hardware resources (counters, etc.) are provided for facilitating the determination of these key instants.

The management choices are made taking into account an "opportunity cost" in QoS and in energy of each execution option. This makes it possible to exactly quantify the difference in terms of performance compared to a minimum QoS setting that it is sought to ensure. A new method for computing this opportunity cost is also provided.

In a first characterization step, the invention also provides a method for selecting different instruction classes according to their emulation costs in terms of performance and energy, making it possible to minimize the estimation error of the opportunity cost of each management opportunity (or "options").

One object of the invention is a computer-implemented method for managing a computation task on a functionally asymmetric multi-core processor, the execution of said task comprising a sequence of application periods, said processor comprising a plurality of cores sharing "basic" instructions, at least one said core comprising at least one hardware extension, said or each hardware extension being suitable for allowing the execution of "specialized" instructions, different from said basic instructions, each specialized instruction thus being associated with a said hardware extension, the method comprising the following steps:

a) starting the execution of the computation task on a core of said processor;

b) in the course of said execution, monitoring a parameter indicative of a quality of service of the computation task, and at least a number of specialized instructions loaded by said core;

c) on the basis of said monitoring, identifying instants splitting an application period of the computation task into a predetermined number of portions such that, in the course of each of said portions, a substantially equal number of specialized instructions associated with a predefined hardware extension are loaded by said core;

d) computing, at said instants and according to said monitoring, costs or gains in quality of service and in energy consumption corresponding to the different management options of the computation task; and e) making a management choice comprising a decision to continue execution on the same processor core or on a different core according to the costs or gains thus computed.

Another object of the invention is a computer program product stored on a nonvolatile computer-readable medium comprising computer-executable instructions for implementing such a method.

Another object of the invention is a functionally asymmetric multi-core processor comprising a plurality of cores sharing "basic" instructions, at least one said core comprising at least one hardware extension, said or each hardware extension being suitable for allowing the execution of "specialized" instructions, different from said basic instructions, each specialized instruction thus being associated with a said hardware extension, characterized in that it also comprises:

filter circuits configured for sorting the basic instructions and specialized instructions associated with the different hardware extensions, and for allocating each specialized instruction to a family; and for each core:

a counter of basic instructions loaded by the core;

for each hardware extension not comprised in said core, a counter of specialized instructions associated with said hardware extension loaded by the core, and a counter of the number of basic instructions used for emulating the associated specialized instructions; and for each hardware extension comprised in said core, and for each family of specialized instructions associated with said hardware extension, a counter of specialized instructions associated with said hardware extension belonging to said family loaded by the core.

Yet another object of the invention is a computer system comprising such a functionally asymmetric multi-core processor and a non-volatile memory storing instructions executable by said processor for implementing a method according to the invention.

BRIEF DESCRIPTION OF THE DRAWINGS

Other features, details and advantages of the invention will emerge from reading the description made with reference to the appended drawings given by way of example and which represent, respectively.

DETAILED DESCRIPTION

In what follows, the following meanings apply:

"Hardware extension," or simply "extension", a circuit such as a floating point computation unit (FPU, Floating Point Unit), a vector computation unit, a cryptographic processing unit, a signal processing unit, etc. A hardware extension introduces a specialized hardware circuit accessible or connected to a processor core, which circuit provides high performance for specific computation tasks. Such a specific circuit improves the performance and energy efficiency of a core for specific computations, but their intensive use may lead to reducing performance in terms of watts per unit area. These hardware extensions associated with the processor core are provided with an instruction set that extends the standard or default (ISA) set. Hardware extensions are generally well integrated into the processing line ("pipeline") of the core, which makes it possible to effectively access functions via instructions added to the "basic" set.

The function of a hardware extension is to accelerate the processing of a specific set of instructions: a hardware extension may not accelerate the processing of another type of instruction (e.g. floating point versus integer).

"Extended core", a processor core comprising a "basic" core, supporting a minimum set of instructions common to all the processor cores, plus one or more hardware extensions.

"Computation task" ("thread"), execution of a set of instructions in the machine language of a processor. A process generally comprises a plurality of computation tasks which, from the user's point of view, seem to run in parallel. The different tasks of the same process share the same virtual memory, but each has its own call stack.

As mentioned above, in a functionally asymmetric multi-core architecture a processor core may be associated with no (i.e. zero), one or more hardware extensions. These hardware extensions are then "exclusive" to it, i.e. a given hardware extension cannot be accessed from a third core. The processor core comprises the hardware extension(s).

A processor core (or simply "core") is a set of physical circuits capable of executing programs "autonomously". A hardware extension is capable of executing a program portion, but is not "autonomous": it requires association with at least one processor core.

Figure 1:
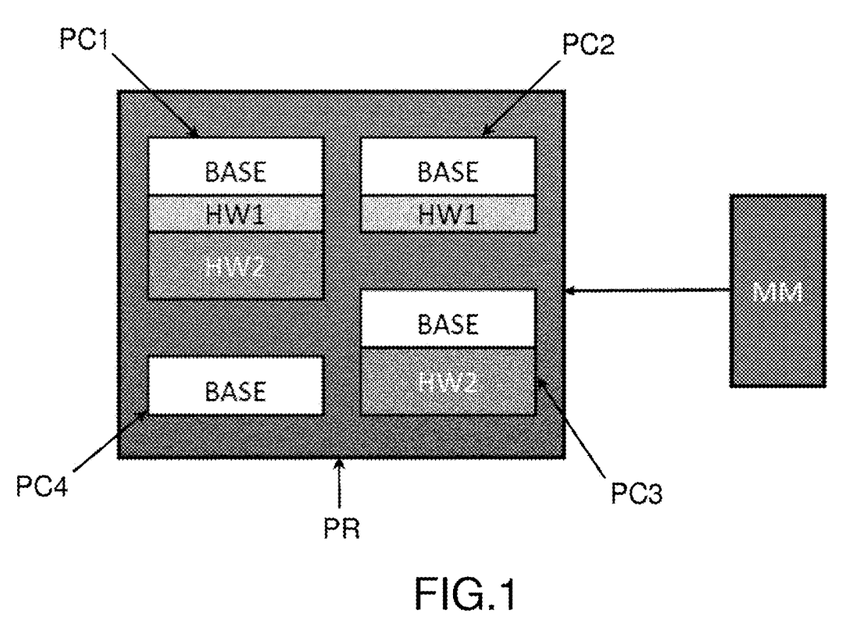
FIG. 1, an example of a functionally asymmetric multi-core processor, the architecture of which is known to the prior art.

FIG. 1 schematically illustrates the architecture of a functionally asymmetric multi-core processor PR incorporating four cores PC1, PC2, PC3, PC4 which share a common base termed the "basic core" BASE and which may each possess one or more hardware extensions HW1, HW2, providing them with more or less extended functionalities. More specifically, the core PC1 is "complete", i.e. it comprises the basic core and the two hardware extensions available; the cores PC2 and PC3 comprise, in addition to the basic core, the single extension HW1 or HW2, respectively; and the core PC4 is "basic", not comprising any hardware extensions.

The reference MM refers to a read-only memory storing instructions executable by the processor PR for implementing the method of the invention.

The processor cores other than PC1 do not comprise all the hardware extensions available. Thus, when a computation task is executed by such a core, it is possible that the latter encounters specific instructions associated with hardware extensions it does not possess. It is therefore necessary to make a "management choice": continue execution on the current processor core by emulating the unsupported specialized instructions (i.e. by converting them into series of basic instructions) or migrating the task onto a core provided with the required hardware extensions; in both cases, it is also possible to act on the voltage-frequency pair. Each of these options has a cost in terms of energy consumed and Quality of Service (QoS), the latter parameter in particular being able to be represented by the inverse of an execution time of the computation task.

The invention makes it possible to optimize the management choices thanks to an accurate prediction of the quality of service (QoS) and the dissipated energy linked to each possible management opportunity, thus facilitating taking multiple criteria into account.

This prediction requires a preliminary calibration step, implemented "offline", consisting in characterizing the costs in time and energy of executing the different specific instructions on the basic cores (by emulating these instructions) and extended cores (in the ones normally executed on these cores). According to a preferred embodiment of the invention, this step comprises determining (generally empirically) calibration parameters representative of the statistical distribution of the emulation costs in time and energy of the specialized instructions. For example, these parameters may be the maximum cost, the minimum cost, the average cost and the standard deviation of the distribution of the costs, measured over multiple executions of these instructions, with different catenations and various data sets.

Advantageously, these parameters are not determined for each instruction considered in isolation, but for "families" comprising specific instructions associated with the same hardware extension and having comparable execution costs. This offers a double advantage: firstly, a simplification of the operations for predicting the cost of the tasks (performed "online"), secondly—if the breakdown into families is done in a timely manner—a minimization of the estimation error made during these prediction operations.

Figure 2:
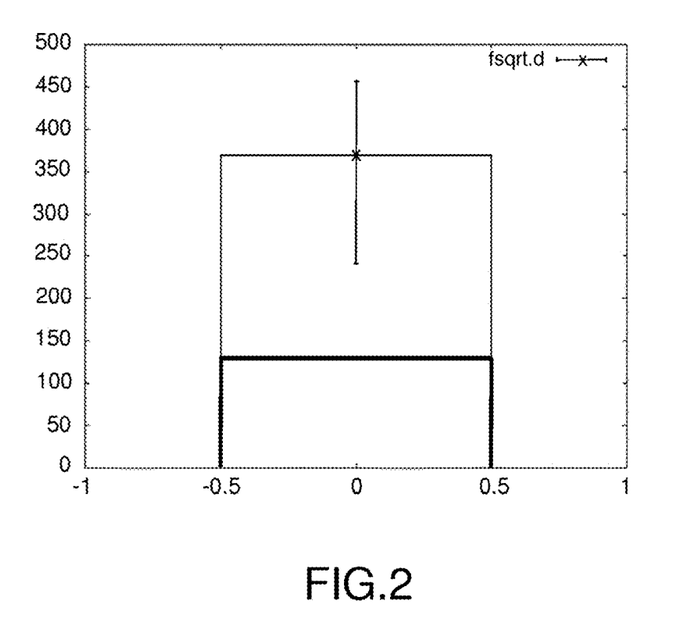
FIG. 2, a histogram of the emulation cost of a floating point computation instruction.

For example, on the RISC-V core the cost of the emulation in number of equivalent basic instructions for floating-point type specific instructions varies from 150 to 470 basic instructions. FIG. 2 gives the cost of emulating the floating point square root instruction "fsqrt" in equivalent basic instructions (ordinate axis). It comprises a constant portion (rectangle in thick line in FIG. 2) with more than 120 equivalent instructions (for the context backup, its recovery and the call to the emulation routine) and a portion dependent on the instruction to be emulated (thin line). The average cost of emulating this instruction is 360 basic instructions with a significant standard deviation, represented by an error bar.

The solution consisting in grouping the specific floating point instructions into a single family and considering an average cost of 282 basic instructions corresponding to the characterization offline of these specific instructions, gives an estimation error of the order of 25-50% on the sets of instructions considered, which is not satisfactory.

According to one embodiment of the invention, provision is made to undertake a breakdown by scanning the number of families "i" and the width of the cost interval of each family that minimizes the estimation error of the emulation cost (in time and energy) of the specific instructions considered. This scanning is carried out on the basis of sets of tests including unit tests per instruction and actual application tests from sets of tests commonly used by the scientific community. It may be conducted experimentally/empirically, as by the use of a heuristic or any other operational search algorithm. For example, it is advantageous to group together the instructions possessing a low standard deviation or a significant overall occurrence frequency in order to avoid degrading the final estimation error.

Increasing the number of families reduces the width of the cost intervals and accordingly the estimation error of these costs. But if the number of families is greatly increased, an inverse phenomenon is observed which raises the estimation error due to the standard deviation of the emulation cost of some instructions. A compromise therefore has to be found because then, as will be explained in detail later, monitoring is required by implementing specific counters for each family of instructions.

A study has been carried out based on the RISC-V processor core. By imposing a maximum tolerable estimation error of 5%, it was possible to define two families of floating point instructions with an average error of 3% and a maximum error of 4%.

For each extension ($HW_m$), and once the number of families "i" and their average costs in terms of number of equivalent basic instructions ($Inst\_average\_cost_{(m,i)}$ and energy ($average\_cost\_E_{(m,\,i)}$) are determined, these characteristics offline will be embedded and used online for estimating the costs/gains in performance and energy of the different management opportunities.

For obtaining this estimate, it is necessary to implement—online—several steps:

1. Monitoring the QoS and the execution of the specialized instructions;
2. A splitting of each application period of the computation task considered into "portions", made according to this monitoring;
3. The computation of costs or gains in quality of service and energy consumption corresponding to different management opportunities or options. This computation is based on the splitting of the application periods and on the data obtained by the monitoring.

1. Monitoring the Execution of the Specialized Instructions and the Application QoS 1.1 Monitoring the Execution of the Specialized Instructions In order to better predict the future execution of the specialized instructions, monitoring the past execution of these instructions and their classification according to their families is needed. This monitoring mainly consists of counting the number of specialized instructions associated with each extension. More specifically, each core must count:

the number of specialized instructions associated with each hardware extension that the core does not comprise (these instructions cause an exception which calls an emulation routine);

for the specialized instructions associated with the hardware extensions that the core comprises, the number of specialized instructions associated with each family (these instructions are executed directly); and the number of basic instructions.

Figure 3:
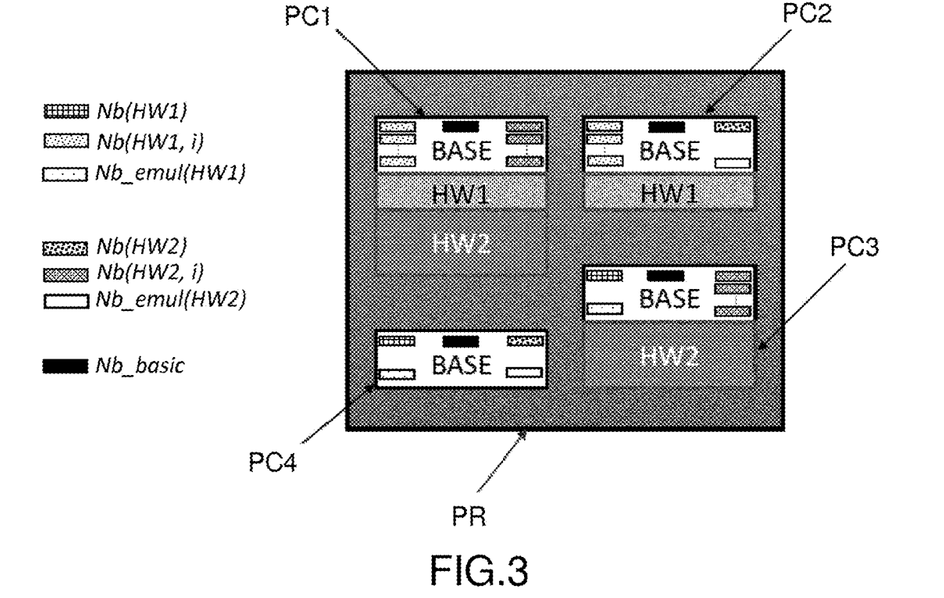
FIG. 3, the functionally asymmetric multi-core processor in FIG. 1, provided with hardware instruction counters in accordance with an embodiment of the invention.

According to a preferred embodiment of the invention, the monitoring is carried out thanks to digital filter circuits of a portion of the binary encoding of each instruction ("opcode", or "operation code") for sorting the basic instructions and the specialized instructions associated with the different hardware extensions and, if necessary, for allocating each specialized instruction to a family, and similar hardware counters to the counters commonly present in embedded processors (cycle counters, floating instruction counters, default cache counters, etc.), which would count the occurrence of the instructions of each family. These counters may be read, and resets may be ordered at very specific instants of the method. Priority is given to the counting of instructions loaded by the core since the loading of the instructions is always performed regardless of the type of core (they may then be executed if the core supports them or otherwise cause an exception and call an emulation routine).

In FIG. 3:

The core PC1 comprises:
a set of counters Nb(HW1,i) counting the number of instructions loaded belonging to each family "i" of the hardware extension "HW1";
a set of counters Nb(HW2,i) counting the number of instructions loaded belonging to each family "i" of the hardware extension "HW2"; and
a counter Nb_basic counting the number of basic instructions loaded.

The core PC2 comprises:
a set of counters Nb(HW1,i) counting the number of instructions loaded belonging to each family "i" of the hardware extension "HW1",
a counter Nb(HW2) counting the number of instructions loaded associated with the hardware extension "HW2", without distinguishing the different families of instructions;
a counter Nb_basic counting the number of basic instructions loaded; and
a counter Nb_emul(HW2) counting the number of basic instructions used for emulating the specialized instructions associated with the hardware extension "HW2".

The core PC3 comprises:
a counter Nb(HW1) counting the number of instructions loaded associated with the hardware extension "HW1", without distinguishing the different families of instructions;
a set of counters Nb(HW2,i) counting the number of instructions loaded belonging to each family "i" of the hardware extension "HW2",
a counter Nb_basic counting the number of basic instructions loaded; and
a counter Nb_emul(HW1) counting the number of basic instructions used for emulating the specialized instructions associated with the hardware extension "HW1".

The core PC4 comprises:
a counter Nb(HW1) counting the number of instructions loaded associated with the hardware extension "HW1", without distinguishing the different families of instructions;
a counter Nb(HW2) counting the number of instructions loaded associated with the hardware extension "HW2", without distinguishing the different families of instructions;
a counter Nb_basic counting the number of basic instructions loaded;
a counter Nb_emul(HW1) counting the number of basic instructions used for emulating the specialized instructions associated with the hardware extension "HW1"; and
a counter Nb_emul(HW2) counting the number of basic instructions used for emulating the specialized instructions associated with the hardware extension "HW2".

The instruction filtering circuits are not represented so as to avoid overloading the figure.

Advantageously, the digital filter circuits filter the instructions loaded by the core at the time of instruction decoding (opcode filtering) for identifying whether the current instruction is of type "m" (i.e. is associated with the hardware extension "m") and, if so, whether it belongs to the family "i" of this extension. A possible optimization of this embodiment consists in rectifying the split into families made in the first step of the method for reducing these intervals to classes of similar instructions (memory access, computation, control, etc.) sharing the same opcode thus facilitating the filtering of the instructions at the time of decoding. A computation of the estimation error with the new split should be performed for verifying that it remains below the tolerable error.

For counting basic instructions (Nb_basic) it may be advantageous to filter the specialized instructions at the time of decoding by opcode and disengaging the counter Nb_basic during the execution of these instructions. The counter Nb_basic is also disengaged at the input of an exception and engaged at its output.

In principle, these counters could be implemented in software, but this would be costly in time and energy. An at least partly hardware embodiment is therefore preferred.

The monitoring of the instructions loaded, performed via these counters, makes it possible to compute the use ratio of the set of specialized instructions associated with each hardware extension "m" (regardless of whether these instructions are actually executed by the appropriate hardware extension or are emulated by a basic core):

$$\mathcal{T}_m = \frac{Nb(m)}{Nb\_basic} \qquad [1]$$

In the event that the count is carried out by families, Nb(m) is obtained by summing Nb(m,i) for all values of "i".

1.2 Monitoring the Application QoS

This monitoring may be based on a less intrusive instrumentation technique of the application code such as the "Heartbeat" technique, disclosed in the publication:

H. Hoffmann, J. Eastep, M. D. Santambrogio, J. E. Miller, A. Agarwal, "Application Heartbeats: A Generic Interface for Specifying Program Performance and Goals in Autonomous Computing Environments", Proceedings of the 7th International Conference on Autonomic Computing, New York, N.Y., USA, 2010, pp. 79-88.

Figure 4:
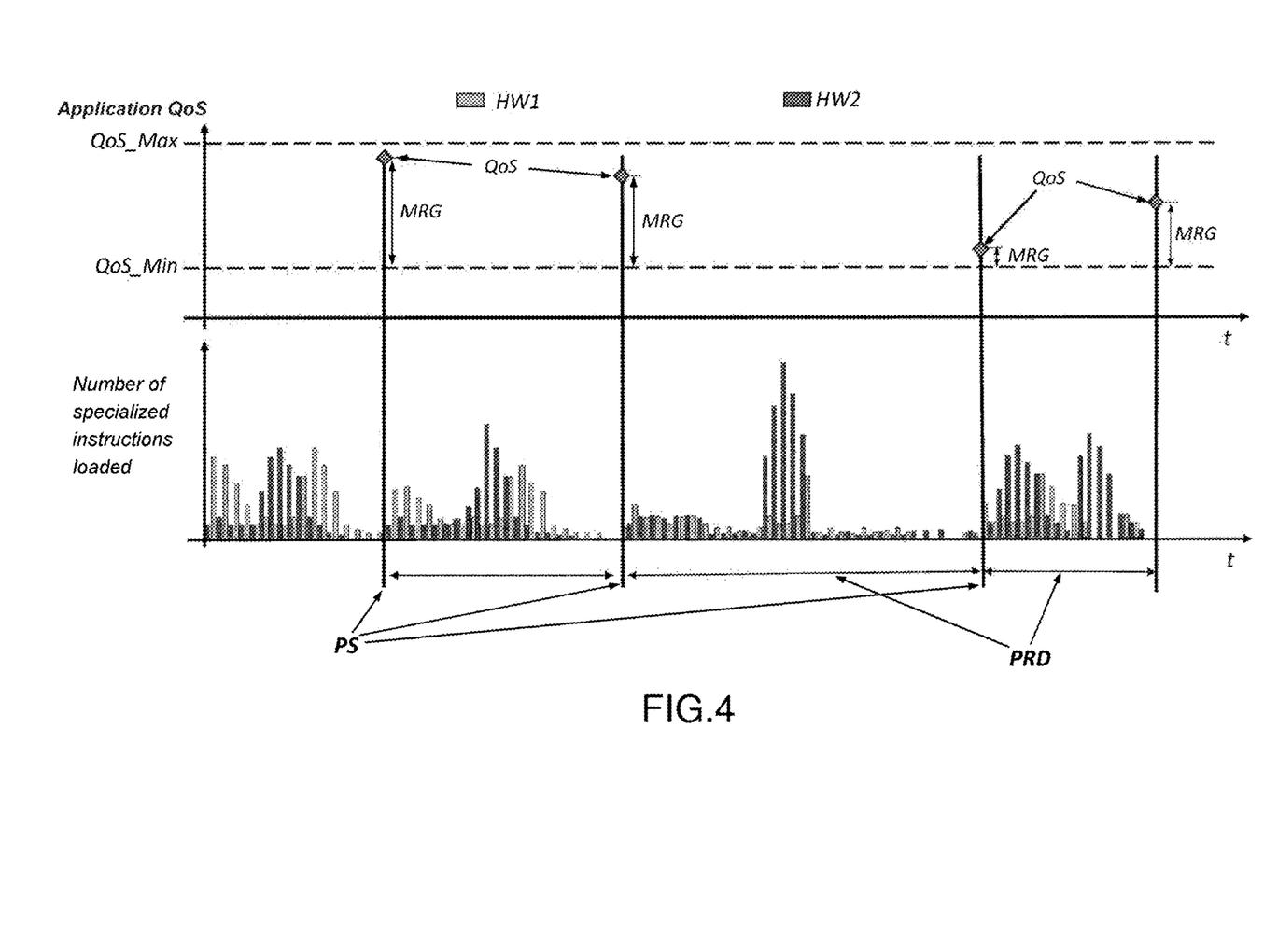
FIG. 4, a graph illustrating the splitting of the execution of an application into application periods, monitoring the quality of service for each period and the number of specialized instructions loaded for each hardware extension.

It allows the system to retrieve application events (called "application heartbeats", or simply "heartbeats" hereinafter) making it possible to compute a quality of service then verify that it is above a minimum QoS setting given by the user. These application events also serve to engage management actions that would be more or less aggressive depending on the margin on the QoS that has just been computed. This is illustrated in FIG. 4, which depicts a timing diagram of the number of specialized instructions loaded which are associated with the two hardware extensions considered, HW1 and HW2; "t" designates the execution time. The heartbeats PS are indicated by vertical lines, and split the execution time into "application periods" (or simply "periods") PRD. The quality of service QoS is measured at each heartbeat for the period that has just elapsed, and a margin MRG is computed with respect to a minimum quality level QoS_Min. A maximum quality level QoS_Max is also indicated; indeed, it is generally desired not to provide an unnecessarily high quality level.

2. A Splitting of Each Application Period of the Computation Task Considered into "Portions"

Predicting the future executions of the specialized instructions is generally based on learning from the past use of the extension. In the literature, the learning period is often constant, linked to the events of the scheduler. For increasing and refining the management opportunities within a period, the invention provides for monitoring and predicting the use of the specialized instructions on portions of the "application period" and thus being suited to use profiles of the specialized instructions changing from one period to another. A "portion" is the minimum time interval for each management decision of the method provided.

In accordance with the invention, each period is subdivided into N "portions" of non-constant durations and this according to the number of specialized instructions loaded associated with the hardware extension "$HW_m$" the emulation cost of which over this period will be the most disadvantageous in terms of performance. N is a number which may be arbitrarily set from the start of the execution or following a calibration phase at the start of the execution.

For defining which is the hardware extension "m" that is the most disadvantageous in terms of performance, at the startup of the application, following a calibration phase (one or more heartbeats), the computation is made of the relative emulation cost Relative_cost$_{(m, n)}$ at the end of the current period "n" and for each hardware extension "m":

$$\text{Relative\_cost}_{(m,n)} = \frac{Nb_{(m,n)} \times \text{Inst\_average\_cost}_{(m)}}{Nb\_\text{basic}_{(n)}} = \mathcal{T}_{(m,n)} \times \text{Inst\_average\_cost}_{(m)} \quad [2]$$

where $\mathcal{T}_{(m,n)}$ represents the use ratio of the extension m over the period n (see equation [1]). m is chosen which gives the cost: Relative_cost$_{(m,n)}$=Max$_m$(Relative_cost$_{(m,n)}$)

The determination of the most disadvantageous hardware extension may be carried out offline for each application to be executed on the platform. It may be computed online and updated each time a new application is executed (therefore with a single calibration phase at the start of the execution of each application) or within the same application (in the case of very dynamic applications) after each "P" application heartbeats (the calibration phase is repeated after each P heartbeats, P being a constant number, predefined before the execution).

The splitting of an application period into portions uses the knowledge, obtained by the monitoring described above, of the overall number (all families together) of specialized instructions associated with the hardware extension "$HW_m$" loaded at the end of the current period "n": $Nb_{(m, n)}$.

This knowledge makes it possible indeed to predict the overall number of specialized instructions associated with the hardware extension "$HW_m$" for the next application period ($Nb\_Pred_{(m, n+1)}$). This prediction may, for example, be obtained by computing an exponential moving average (EMA), with a smoothing factor "$\alpha$" ($\alpha<1$) that is adaptable according to the dynamicity of the application. Then:

$$Nb\_Pred_{(m,n+1)} = \alpha \cdot Nb_{(m,n)} + (1+\alpha) Nb\_Pred_{(m,n)} \quad [3]$$

For this hardware extension m, a portion of the current period finishes when the predicted number of specialized instructions of the hardware extension "$HW_m$" over the current period ($Nb\_Pred_{(m, n)}$), divided by N, has been loaded.

This splitting of the application periods into portions according to the number of specialized instructions loaded makes it possible to estimate the intermediate QoS directly. It also makes it possible to predict the use of specialized instructions on the portion in question regardless of the allocation made to the same portion of the preceding period (portion executed on a basic or extended core).

Figure 5:
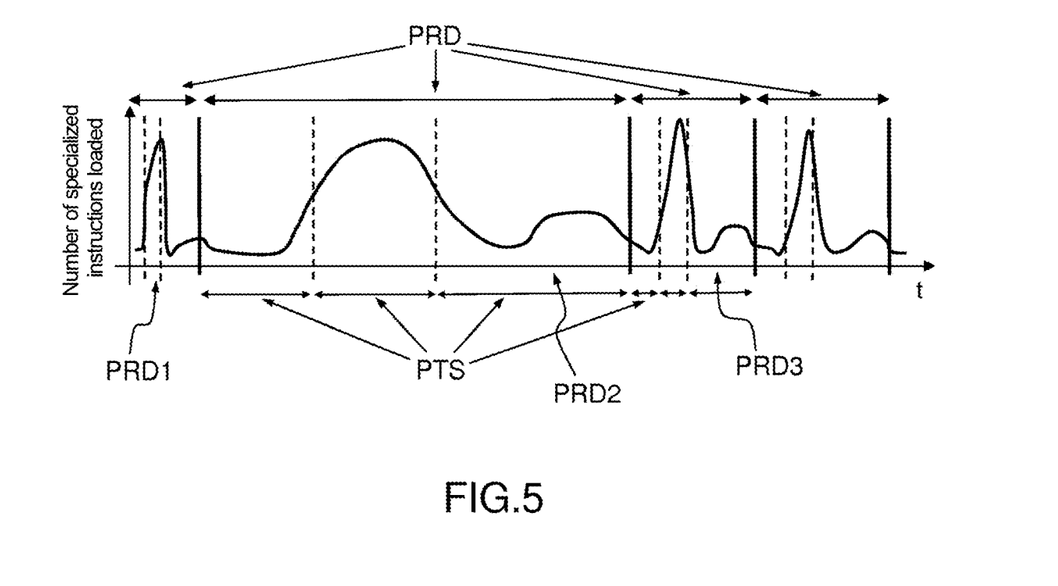
FIG. 5, a graph illustrating the splitting of the application periods into segments, in accordance with an embodiment of the invention.

FIG. 5 demonstrates the value of a breakdown of the periods PRD into N portions PTS (in the example, N=3) according to the number of specialized instructions loaded for prediction while remaining independent of the allocation. In the example considered, the second application period PRD2 has been executed on a basic core and the third, PRD3, on an extended core (just like the first period PRD1). If based on fixed duration portions, no simple relationship could be found between the data collected in the period PRD2 for predicting that of the same portion in the period PRD3. A split into fixed duration periods also requires both more interventions of the controller and also fairly expensive interpolations for reducing the collected measurements into usable data for prediction. On the other hand, in accordance with the invention, the portions comprise a substantially equal number of specialized instructions, which makes it possible to connect portions of the same rank from different periods.

For defining the portions of the periods, it is necessary to count the overall number of specialized instructions loaded for the extension "$HW_m$". For accelerating this counting and making it the least intrusive it may be advantageous to provide a dedicated hardware counter which is incremented at each loading of a specialized instruction of the extension "$HW_m$" and which triggers an interrupt on the core in question for calling a monitoring and system management routine which must be engaged at each portion. In this embodiment, the periods preferably comprise exactly the same number of specialized instructions loaded for the extension "$HW_m$" (except the last period, which may be incomplete). In degraded variants, however, a margin of tolerance—typically less than 10% or even 5%—may be allowed.

In another embodiment, it is possible to use an alarm counter with a set time quantum which raises an interrupt on the current core. The routine called by this interrupt consults the hardware counter of the number of specialized instructions of the extension "$HW_m$" and calls the management routine when the number of specialized instructions required per portion is reached. In this embodiment, the number of specialized instructions loaded for the extension "$HW_m$" is approximately the same, where the smaller the time quantum, the smaller the error margin there is. Preferably, this quantum will be chosen so that the margin of error is less than 5%, or even 10%.

In general, the passage from one application period to the next takes place when the number of specialized instructions reaches or exceeds a predefined threshold value.

3 Predicting the Future Executions of the Specialized Instructions

The invention provides for monitoring, for each portion "k" of the period "n":

the number of specialized instructions executed in each family "1" identified in the first step of the method: $Nb_{(m, i, k, n)}$;

the total number of instructions executed apart from emulation for the basic cores and apart from specialized instructions for the extended cores: $Nb\_basic_{(k,n)}$;

the effective execution time of the portion k of the period n: $T_{(k,n)}$; and the number of basic instructions linked to the emulation of each absent extension "$HW_m$": $Nb\_emul_{(m,k,n)}$.

Except with regard to the execution time, the monitoring is performed by means of the counters described above with reference to FIG. 3.

The method provides for predicting, for the same portion k of the next application period n+1:

the number of specialized instructions of each family "i" of the extension "$HW_m$":

$$Nb\_Pred_{(m,i,k,n+1)} = \alpha \cdot Nb_{(m,i,k,n)} + (1-\alpha)Nb\_Pred_{(m,i,k,n)} \quad [4]$$

the number of instructions executed apart from emulation and apart from specialized instructions of the extension "$HW_m$":

$$Nb\_Pred\_basic_{(k,n+1)} = \alpha \cdot Nb\_basic_{(k,n)} + (1-\alpha)Nb\_Pred\_basic_{(k,n)} \quad [5]$$

the number of basic instructions linked to the emulation of each absent extension "$HW_m$":

$$Nb\_Pred\_emul_{(m,k,n+1)} = \alpha \cdot Nb\_emul_{(m,k,n)} + (1-\alpha)Nb\_Pred\_emul_{(m,k,n)} \quad [6]$$

These recursive equations must be initialized. The initialization values may, for example, be obtained by calibration.

Estimating the Costs/Gains in Performance and Energy of the Different Management Opportunities Once the future use of the hardware extensions has been predicted, it is possible to estimate the costs/gains in performance and energy of each of the management opportunities which are offered on the next portion of the current period. These opportunities are, for example:

Migration of an extended core (with its variants Full, (base+$HW_1$), (base+$HW_2$)) (resp. basic) to a basic (resp. extended) core. This comprises a backup of the current execution context on the extended (resp. basic) core, the activation of a basic (resp. extended) core if there are no active and free cores at that time, the migration of the context to this new target core, placing the extended (resp. basic) core into low consumption non-functional mode and continued execution of the basic (resp. extended) core.

Changing the voltage frequency pair (DVFS—"Dynamic Voltage and Frequency Setting", that is to say dynamic adjustment of the voltage and frequency) on the current core: decision to continue the execution of the current core but with a different voltage frequency pair.

Any combination of the last two opportunities (migration+DVFS)

The estimate made of the costs/gains in performance and energy is made on the basis of an entire period. In this step the method estimates the QoS and the energy consumed at the period end by estimating decisions at the level of the portions.

The application QoS is often reduced to the inverse of an execution time over the application period considered. This time may be estimated by summing the estimates of the execution times over the different portions of this period.

The consumed energy is the sum of the contributions of the cores, estimated according to the allocation made and according to the DVFS pair chosen on each portion, then reduced over the entire period.

Emulation/Acceleration Cost:

Compared to the same portion of the preceding period, the emulation overhead in time of the instructions of the hardware extension "m" on the portion "k" predicted for the period n+1 and for an execution frequency F1, is given by:

$$K_{emul\_time(m,k,n+1,F1)} = \frac{\sum_i (Nb\_Pred_{(m,i,k,n+1)} \times Inst\_average\_cost_{(m,i)}) \times CPI}{F1} \quad [7]$$

where $Nb\_Pred_{(m,i,k,n+1)}$ is the number of specialized instructions predicted over the period n+1 of the family i on the portion k (see equation [4]). CPI ("Cycles Per Instruction") is the parameter for quantifying the average cost of an instruction in terms of processor cycles. By dividing this number of cycles by the frequency (here F1) of the processor the average execution time of an instruction is obtained.

Compared to the same portion of the preceding period, the overhead (here negative) of an acceleration of the instructions of the hardware extension "m" in migrating to a core with this extension is given by:

$$K_{accel\_time(m,k,n+1,F1)} = -\frac{Nb\_Pred\_emul_{(m,k,n+1)} \times CPI}{F1} \quad [8]$$

Compared to the same portion of the preceding period, the emulation overhead in energy of the instructions of the hardware extension "m" on the portion "k" predicted for the period n+1 and for an execution frequency F1, is given by the following equation for the two variants: $K_{emul\_energy}$ overhead due to the emulation and $K_{accel\_energy}$ overhead due to the acceleration on a core with extension "m":

$$K_{emul/accel\_energy(m,k,n+1,F1)} = \quad [9]$$
$$(K_{emul/accel\_energy(m,k,n+1,F1)} \times P_2) + \frac{Nb\_total_{(k,n)} \times (P_2 - P_1) \times CPI}{F1}$$

Where P1 and P2 represent the average powers of the current core and destination core respectively.

P1 represents the power of the core possessing the extension "m" (respectively lacking the extension "m") and P2 is that of the core lacking this extension (respectively possessing the extension "m") and to which the cost of migration is estimated in the case of an emulation (respectively in the case of an acceleration). Nb_total$_{(k,n)}$ is the total number of instructions over the preceding period "n" and over the same portion "k".

Cost of Changing Voltage/Frequency (DVFS):

Compared to the same portion of the preceding period, the overhead in time of changing the voltage frequency pair on the portion "k" with constant allocation predicted for the period n+1 and for a change from an execution frequency F1 to F2, is given by the following equation:

$$K_{DVFS\_energy(m,k,n+1,F1 \to F2)} = \text{Nb\_total}_{(k,n)} \times CPI \times \left(\frac{F1-F2}{F1 \times F2}\right) \quad [10]$$

Compared to the same portion of the preceding period, the overhead in energy of changing the voltage frequency pair on the portion "k" with constant allocation, predicted for the period n+1 and for a change from an execution frequency F1 to F2, is given by the following equation:

$$K_{DVFS\_energy(m,k,n+1,F1 \to F2)} = \quad [11]$$
$$K_{DVFS\_time(m,k,n+1,F1 \to F2)} \times \left(\frac{F1 \times P2 - F2 \times P1}{F1 - F2}\right)$$

Where P1 (respectively P2) represents the average power of the current core at the DVFS operating point given by the frequency F1 (respectively F2).

Cost of Simultaneously Changing the Voltage/Frequency Pair (DVFS) and Allocation (Emulation/Acceleration):

Compared to the same portion of the preceding period, the overhead in time of changing the voltage frequency pair on the portion "k" with constant allocation, predicted for the period n+1 and for a change from an execution frequency F1 to F2, is given by the following equation with the two variants:

$K_{DVFS\_emul\_time}$ overhead due to the emulation and DVFS; and $K_{DVFS\_accel\_time}$ overhead due to the acceleration on a core with extension "m" and DVFS:

$$K_{DVFS\_emul/accel\_time(m,k,n+1,F1 \to F2)} =$$
$$K_{emul/accel\_time(m,k,n+1,F2)} +$$
$$K_{DVFS\_time(m,k,n+1,F1 \to F2)} \quad [12]$$

Compared to the same portion of the preceding period, the overhead in energy predicted for the period n+1 of changing the voltage frequency pair on the portion "k" and for a change from an execution frequency F1 to F2 with migration, is given by the following equation with the two variants:

$K_{DVFS\_emul\_energy}$ overhead due to the emulation and DVFS; and $K_{DVFS\_accel\_energy}$ overhead due to the acceleration on a core with extension "m" and DVFS:

$$K_{DVFS\_emul/accel\_energy(m,k,n+1,F1 \to F2)} =$$
$$(K_{emul/accel\_time(m,k,n+1,F2)} \times P2) +$$
$$K_{DVFS\_energy(m,k,n+1,F1 \to F2)} \quad [13]$$

Where P1 represents the average power of the current core at the DVFS operating point given by the frequency F1 and P2 represents the average power of the destination core at the operating point given by the frequency F2.

Decision-Making

Estimating the cost of the different management options is used to enable a decision to be made ensuring a minimum QoS while minimizing the energy consumed.

Figure 6:
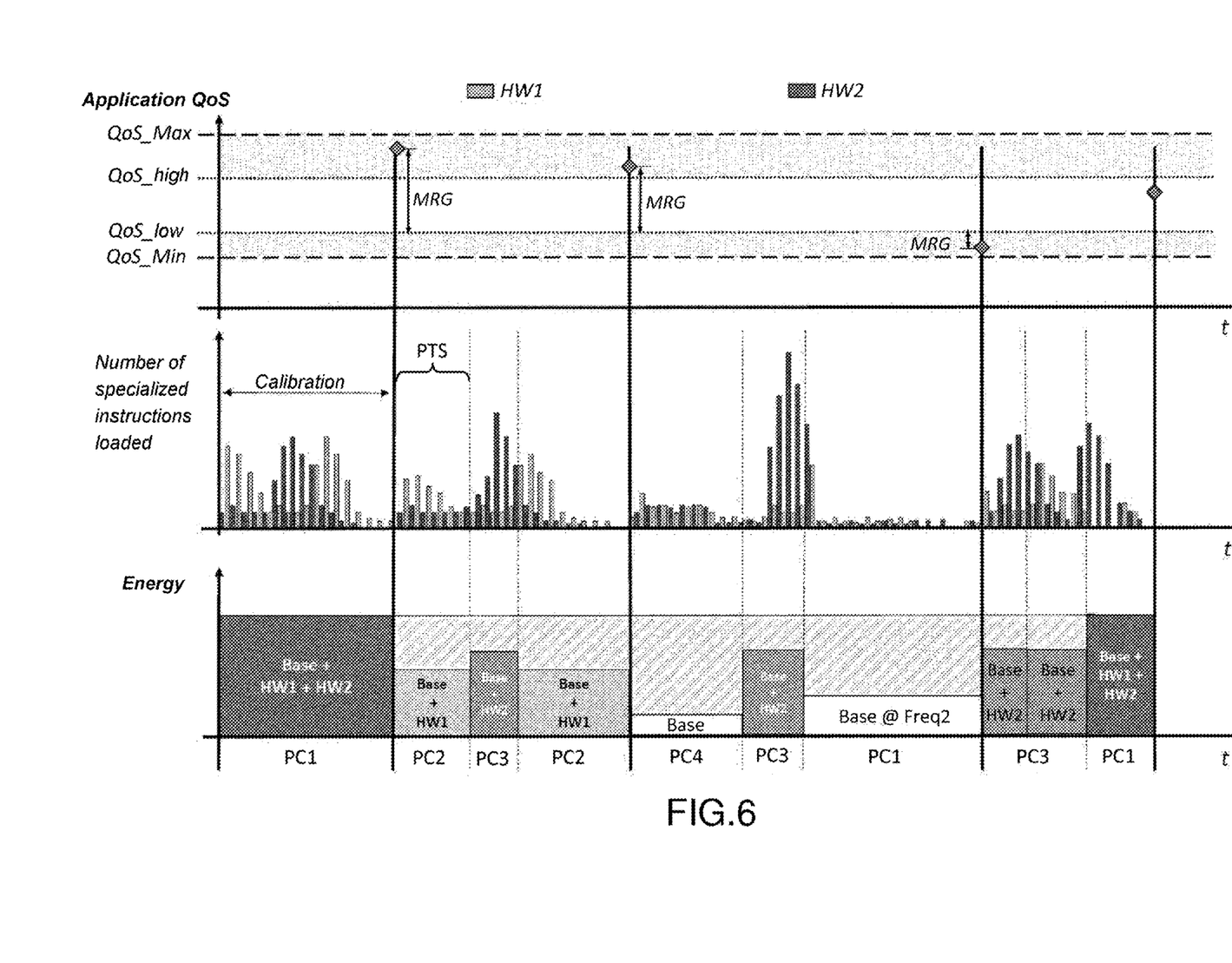
FIG. 6, a graph illustrating the management choices made in accordance with an embodiment of the invention.

FIG. 6 gives an example of decision-making at the granularity of a portion for maintaining a quality of service above the minimum QoS and minimizing the energy. This figure repeats FIG. 4 while adding thereto:

the breakdown of the periods into portions;

the indication of the processor core used in each portion, and the corresponding energy consumption.

For ensuring this condition and avoiding oscillations and superfluous management, two decision-making intervals are defined [QoS_Min, QoS_bas] and [QoS_Haut, QoS_Max] (represented in FIG. 6) in which the decision is made to trigger management actions and the system is kept unaltered if the computed QoS falls within the intermediate interval [QoS_bas, QoS_Haut].

In one embodiment of the invention, it is sought to determine the margin with respect to the quality of service QoS_bas (as illustrated in FIG. 6) over the last period executed and to distribute this margin over the different portions of the next period so that the decisions made at the portion level benefit from this margin portion for choosing a management opportunity (migration, change of DVFS pair, a combination of the two) which reduces the energy consumed subject to compliance with this margin portion.

The QoS margin is reduced to a margin of time "$\mu_{QoS}$": positive when the QoS$_n$ is greater than QoS_bas and negative otherwise (case of the margin on the third period in FIG. 6) and its distribution over the N portions of the period may take place equally as it may be more intelligently chosen, e.g. with respect to the use ratio of the extension "m" the emulation of which is more disadvantageous in time ('T$_m$' see equation [1]) computed on each portion "k"': T$_{(m, k, n)}$. One implementation would, for example, give priority to the distribution of the margin to the period portions with the lowest use ratios since they have greater emulation opportunities.

A second margin (also positive or negative) may be introduced with respect to predicting the evolution of the number of specialized instructions over time.

At the end of each portion k of the period n the prediction of the execution time is computed, with constant allocation, of the portion k at the period n+1:

$$T\_Pred_{(k,n+1)} = \frac{CPI}{Freq} \times \quad [14]$$
$$\left[ \begin{array}{c} \text{Nb\_Pred\_basic}_{(k,n+1)} + \\ \sum_{emulated\ m} \left( \sum_i \text{Nb\_Pred}_{(m,i,k,n+1)} \times \text{Inst\_average\_cost}_{(m,i)} \right) + \\ \sum_{executed\ m'} \left( \sum_i \text{Nb\_Pred}_{(m',i,k,n+1)} \right) \end{array} \right]$$

This estimate takes into account the emulation of the unsupported hardware extensions (emulated m) by the core used at the portion k of the period n by summing the cost of their emulation and the execution of the predicted instructions of the supported extensions (executed m').

The second usable margin may be computed by the following equation:

$$\mu_{pred(k)} = T\_Pred_{(k,n+1)} - T_{(k,n)} \quad [15]$$

where T(k,n) is the effective execution time on the portion k of the preceding period n:

The margin collected by the portion k is:

$$\mu_{(k)} = \mu_{QoS(k)} + \mu_{pred(k)} \quad [16]$$

Advantageously, this method operates incrementally starting from the implementation chosen at the same portion of the preceding period and estimating the overheads of the management opportunities. The choice of the most appropriate management opportunity vis-à-vis the margin "$\mu_{(K)}$" allocated to the portion k is made advantageously by considering a parameter which jointly incorporates performance and energy as the EDP ("Energy Delay Product").

According to one embodiment of the invention, the difference in overheads (reduced to an energy value) is used as a parameter to be maximized for guiding the choice of management opportunity. For a management opportunity "opp", for a portion "k" and an average power $P_1$ (power of the core used at the portion k of the preceding period), this difference is given by the following formula:

$$D_{opp(k)} = (K_{opp\_time(k)} \times P_1) - K_{opp\_energy(k)} \quad [17]$$

In equation [17], $K_{opp\_time(k)}$ is the cost in time of a management opportunity; according to the opportunity adopted, it may be equal, for example, to $K_{emul\_time}$, $K_{accel\_time}$ or $K_{DVFS\_time}$. Similarly, $K_{opp\_energy(k)}$ is the cost in energy of a management opportunity; according to the opportunity adopted, it may be equal, for example, to $K_{emul\_energy}$, $K_{accel\_energy}$ or $K_{DVFS\_energy}$.

The condition to be satisfied is therefore:

$$K_{opp\_time(k)} \leq \mu_{(k)}$$

and $$D_{opp(k)} = \text{Max}_{all\ the\ opp}(D_{opp(k)}) \quad [18]$$

For example, on the first portion of the third period in FIG. 6 it is seen that the decision was made to change the preceding allocation (first portion of the second period), which was on a basic core with an extension HW1 to a basic core since the margin allocated to this period portion allowed it to be done with a lower energy consumption. For the third and last portion of the period 3, it may be observed that the opportunity that maximized the difference in overhead D on this portion was the one which migrated to a basic core and at the same time changed the execution frequency on this core.

Another possible embodiment of the decision-making phase is based on the principle of prioritizing the allocation on a basic core on the first portions, as long as the estimation of the end-of-period QoS remains above the minimum quality of service, and then accelerating execution by migrating to an extended core in the last portions. This method tends to delay migration on an extended core as much as possible while ensuring a minimum end-of-period QoS thus prioritizing the use of less efficient, but energy-saving, basic cores.

In this embodiment, right at the end of the portion k−1 of the current period, the estimation of the end-of-period QoS considers an allocation of the portion k on a basic core and an allocation of the following portions (k+1 to N) on an extended core.

In this method, the allocation to the first portion is estimated on a basic core with all the other portions on an extended core and it is verified whether the end-of-period QoS remains above $QoS_{min}$.

The prediction of the execution time on an extended core of the portion k ($T\_Extended\_Pred_{(k)}$) corresponds to the computation of $T\_Pred_{(k,\ n+1)}$ in equation [14] by considering that all the extensions are present. Similarly, the prediction of the execution time on a basic core of the portion k ($T\_Extended\_Pred_{(k)}$) corresponds to the computation of $T\_Pred_{(k,n+1)}$ in equation [14] by considering that all the extensions are emulated.

The end-of-period QoS predicted by estimating that the portion k is allocated on a basic core and that the rest of the portions are allocated on an extended core, is computed by the following equation:

$$QoS\_Pred_{n+1} = \Sigma_{1 \leq j < k} T_{(j,n)} + T\_Base\_Pred_{(k)} + \Sigma_{j \leq N-k} T\_Extended\_Pred_{(k+j)} \quad [19]$$

If the condition $QoS\_Pred_{n+1} > QoS_{min}$ is satisfied, the predicted allocation is executed. Otherwise, the frequency of the allocation of the portion k is changed incrementally, then a change of allocation to a low frequency is considered and the frequency is gradually increased and so on.

Dual implementation, which prioritizes the allocation of the portion k on an extended core by considering that the other following portions (k+1 to N) will be allocated on a basic core, is also a possible embodiment. Until the condition $QoS\_Pred_{n+1} > QoS_{min}$ is verified, it is decided to continue to allocate the following portion on the extended core. As soon as this condition is verified, the end-of-period QoS is predicted incrementally by estimating the possible management opportunities, in the same order as in the preceding method.

A method according to the invention is implemented thanks to a computer program product comprising instructions executable by a functionally asymmetric multi-core processor (processor PR in FIG. 1) stored on a non-volatile medium readable by said processor (e.g. a read-only memory MM, illustrated in FIG. 1). Advantageously, as described in particular in relation to FIG. 3, the functionally asymmetric multi-core processor may have specific hardware means: instruction filter circuits and counters. Such a processor and a non-volatile memory storing the computer program product may advantageously form, with other components (random access memories, peripherals, etc.), a computer system, typically embedded.

The invention has been described in relation to a particular implementation, but variants are possible. For example, non-restrictively, other cost computation formulae may be used; the predictions may not be obtained by moving average but, for example, by Kalman filtering; the distribution between functionalities implemented by software or hardware may vary.

The invention claimed is:

1. A computer-implemented method for managing a computation task on a functionally asymmetric multi-core processor, the execution of said task comprising a sequence of application periods, said processor comprising a plurality of cores sharing "basic" instructions, at least one said core comprising at least one hardware extension, said or each hardware extension being suitable for allowing the execution of "specialized" instructions, different from said basic instructions, each specialized instruction thus being associated with a said hardware extension, the method comprising the following steps:

a) starting the execution of the computation task on a core of said processor;
b) in the course of said execution, monitoring:
   a parameter indicative of a quality of service of the computation task,
   at least a number of specialized instructions loaded by said core,
   the number of basic instructions loaded by said core,
   the number of specialized instructions (i) associated with each hardware extension that said core does not comprise and (ii) loaded by said core,
   the number of specialized instructions (i) belonging to each family of specialized instructions associated with each hardware extension that said core comprises and (ii) loaded by said core, and
   the number of basic instructions (i) used for emulating the specialized instructions associated with each hardware extension that said core does not comprise and (ii) loaded by said core;
c) on the basis of said monitoring, identifying instants splitting an application period of the computation task into a predetermined number of portions such that, in the course of each of said portions, a similar number of specialized instructions associated with a predefined hardware extension are loaded by said core;
d) computing, at said instants and according to said monitoring, costs or gains in quality of service and in energy consumption corresponding to different management options of the computation task, one said management option consisting in continuing execution on the same core of the processor and at least one other management option consisting in continuing execution on a different core; and
e) making a management choice consisting in choosing from said management options according to the costs or gains thus computed.

2. The method as claimed in claim 1, wherein said step c) comprises predicting the number of specialized instructions associated with said hardware extension loaded in the course of each portion of a current application period from the number of said specialized instructions loaded during corresponding portions of at least one preceding application period.

3. The method as claimed in claim 1, wherein said predefined hardware extension is that suitable for allowing the execution of the specialized instructions, the emulation of which would have the highest cost in quality of service.

4. The method as claimed in claim 1, wherein the management choice made in step e) comprises the decision to continue the execution of the computation task on the same core or on a different core so as to minimize the energy consumption of the processor while complying with a quality of service constraint.

5. The method as claimed in claim 4, wherein step e) comprises:
   e1) determining a quality of service margin on a preceding application period;
   e2) distributing this margin between the portions of the current period; and
   e3) for each portion of the current period, making a said management choice for reducing the energy consumption subject to compliance with the distributed quality of service margin in said portion, when this is possible.

6. The method as claimed in claim 4, wherein:
in step a), the execution of the computation task is started on a core not comprising any hardware extensions; in said step e), a decision to continue the execution of the computation task on another processor, comprising at least one hardware execution, is made when this is necessary to ensure compliance with a quality of service constraint.

7. The method as claimed in claim 1, wherein said management choice also comprises a decision to maintain or change a clock frequency-power supply voltage pair of the core.

8. The method as claimed in claim 1, wherein the specialized instructions associated with each hardware extension are grouped into a predetermined number of families, this number being greater than 1 for at least one said hardware extension and at least one said family comprising a plurality of instructions; and wherein, in step d), the instructions of the same family are considered as a single instruction for the purposes of computing said costs or gains in quality of service and energy consumption.

9. The method as claimed in claim 8, wherein the number of families wherein the specialized instructions associated with each hardware extension are grouped is chosen so as to minimize the errors affecting the computation of the costs or gains in quality of service and energy consumption made in step d).

10. The method as claimed in claim 1, comprising a preliminary step of loading into memory a set of characterization parameters representative of a statistical distribution of the emulation costs in time and energy of the specialized instructions, wherein step d) is implemented using said characterization parameters.

11. The method as claimed in claim 10 further comprising a preliminary step of calibration for determining said calibration parameters.

12. The method as claimed in claim 1, wherein said parameter indicative of a quality of service of the computation task is representative of the inverse of an execution time of said computation task.

13. A computer program product stored on a non-volatile computer-readable medium comprising computer-executable instructions for implementing a method as claimed in claim 1.

14. A computer system comprising a plurality of cores sharing "basic" instructions, at least one said core comprising at least one hardware extension, said or each hardware extension being suitable for allowing the execution of "specialized" instructions, different from said basic instructions, each specialized instruction thus being associated with a said hardware extension, wherein it also comprises:
   filter circuits, configured for sorting the basic instructions and specialized instructions associated with the different hardware extensions, and for allocating each specialized instruction to a family, where each family comprises one or more specialized instructions associated with the same hardware extension and at least one hardware extension is associated with instructions comprised in a plurality of distinct families; and
   for each core:
      a counter of basic instructions loaded by the core;
      for each hardware extension not comprised in said core, a counter of specialized instructions associated with said hardware extension loaded by the core, and a counter of the number of basic instructions used for emulating the associated specialized instructions;
      for each hardware extension comprised in said core, and for each family of specialized instructions associated with said hardware extension, a counter of specialized instructions associated with said hardware extension belonging to said family loaded by the core; and a non-volatile memory storing instructions executable by said processor for implementing a method as claimed in claim 1.

15. A functionally asymmetric multi-core processor comprising a plurality of cores sharing "basic" instructions, at least one said core comprising at least one hardware extension, said or each hardware extension being suitable for allowing the execution of "specialized" instructions, different from said basic instructions, each specialized instruction thus being associated with a said hardware extension, wherein it also comprises:

filter circuits, configured for sorting the basic instructions and specialized instructions associated with the different hardware extensions, and for allocating each specialized instruction to a family, where each family comprises one or more specialized instructions associated with the same hardware extension and at least one hardware extension is associated with instructions comprised in a plurality of distinct families; and for each core:

a counter of basic instructions loaded by the core;

for each hardware extension not comprised in said core, a counter, of specialized instructions associated with said hardware extension loaded by the core, and a counter of the number of basic instructions used for emulating the associated specialized instructions; and for each hardware extension comprised in said core, and for each family of specialized instructions associated with said hardware extension, a counter of specialized instructions associated with said hardware extension belonging to said family loaded by the core.

* * * * *